F. A. SCHULTZ.
VEHICLE TIRE.
APPLICATION FILED DEC. 28, 1910.

1,006,295.

Patented Oct. 17, 1911.

WITNESSES
J. H. Brophy
C. S. Murdock

INVENTOR
Frederick A. Schultz
BY
Munn & Co.
ATTORNEYS

UNITED STATES PATENT OFFICE.

FREDERICK A. SCHULTZ, OF HASBROUCK HEIGHTS, NEW JERSEY.

VEHICLE-TIRE.

1,006,295.  Specification of Letters Patent.  Patented Oct. 17, 1911.

Application filed December 28, 1910. Serial No. 599,683.

*To all whom it may concern:*

Be it known that I, FREDERICK A. SCHULTZ, a citizen of the United States, and a resident of Hasbrouck Heights, in the county of Bergen and State of New Jersey, have invented a new and Improved Vehicle-Tire, of which the following is a full, clear, and exact description.

Among the principal objects which the present invention has in view are: to provide a resilient filler wherein the air contained in the tire is circulated to prevent local overheating of the tire casing and filler; to provide auxiliary resilient members adapted to augment the carrying capacity of the tire and the resilient quality thereof; to provide a filler for an automobile tire formed from a number of removable and renewable sections, rendering the tire capable of economical and simple repair; to provide a filler economical and simple in construction; and to provide pneumatic means for securing the tire in position on the wheel rim to thereby form a holding device quickly and readily operated to release or imprison the locking members of the tire, and to augment the resiliency of the tire.

One embodiment of the present invention is disclosed in the structure illustrated in the accompanying drawings, in which like characters denote corresponding parts in all the views, and in which—

Figure 1:
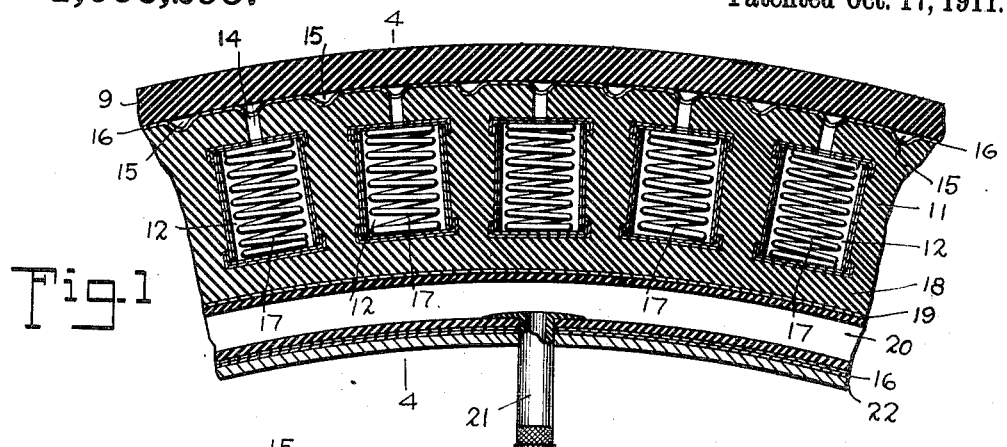
Figure 2:
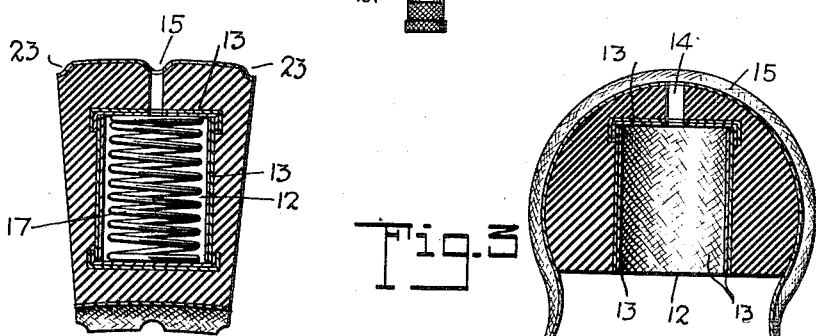
Figure 3:
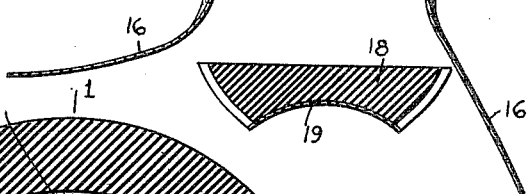
Figure 4:
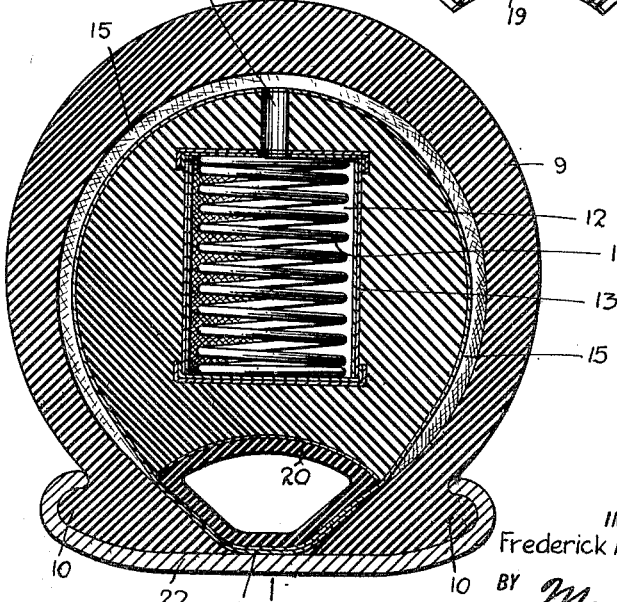

Figure 1 is a vertical longitudinal section of a fragment of a tire of the character mentioned, and filler therefor, constructed and arranged in accordance with the present invention, the section being taken on the line 1—1 in Fig. 4; Fig. 2 is a vertical longitudinal section, on an enlarged scale, of a filler block constructed and arranged in accordance with the present invention, being a modified form thereof; Fig. 3 is a cross section, on an enlarged scale, of a tire filler constructed and arranged in accordance with the present invention, the metallic spring not being shown, and the cap for closing the pockets being removed; and Fig. 4 is a cross section on an enlarged scale, taken on the line 4—4 in Fig. 1.

As shown in the accompanying drawings the tire casing 9 is of usual construction. A preferred form of the ordinary tire is that wherein are provided the clencher beads 10, 10. It is the purpose of the present invention to provide a filler to replace the pneumatic tube usually used in conjunction with the tire casing 9. With this purpose in view a rubber cylinder 11 is molded, having formed therein, at frequent and regular intervals, a series of pockets 12, 12. In constructing the cylinder the pockets 12 are opened, as shown in Fig. 3 of the drawings, the major portion of the cylinder being molded at one operation. The pockets 12 are preferably formed by means of suitable pin projections, the said pins being covered, end and sides, with a cement saturated fabric 13. After the body of the cylinder 11 is molded it will be found that the fabric 13 will strip from the pins, remaining in the body as a structural entity thereof.

When forming the pockets 12, a passage 14 is provided in each of the said pockets opening from the bottom thereof to extend outward and through the wall of the filler to rest, when the tire is completed, adjacent thereto. The mold wherein the filler is formed is provided with suitable members to shape in the filler transverse grooves 15, 15. Certain of the grooves 15 are in line with the passages 14. The grooves 15 are constructed sufficiently deep to prevent being closed by the usual adhesions between the fabric 16 and the tire casing 9. In this manner there is assured a circulation throughout the tire construction in a manner substantially as hereinafter set forth. The fabric 16 is disposed in the mold prior to the rubber of which the cylinder 11 is constructed being placed therein. The rubber permeates the fabric, causing the same to adhere firmly thereto. When molded, the cylinder, if formed as shown in Fig. 3 of the drawings, is provided with spiral springs 17, 17. The springs 17, 17 are preferably of a length to be slightly compressed when the cylinder cap strip 18 is forced over the body portion of the cylinder. After each of the pockets 12 has been provided with a spring 17, the cap strip 18, which, in the preferred form is constructed as a single ring, is adjusted in position upon the body portion of the cylinder, and is forced home in intimate contact with the body portion of the cylinder, to be there heeled. The cap strip 18 is grooved, as shown best in Figs. 3 and 4 of the drawings, and in the groove is placed the protective fabric 19. When completed, the cross section of the filler is, as shown substantially in Fig. 4 of the drawings, a solid circular cylinder adapted to fill the tire 9, having within the pockets of said cylinder a series of springs 17, the expansible strength whereof is varied to suit the uses to which the tires are to be applied. The walls of rubber intervening between the pockets 12, it will be understood, may be of any suitable dimension, as experience and the needs of the various trades for which the tires are designed shall dictate. To complete the filler for the tire casing 9 an air tube 20 is provided. The air tube rests in the groove and upon the fabric 19 therein. It is in this position expanded, air being introduced within the tube through a valve 21. When expanded the flaps of the fabric 16, as shown in Fig. 3 of the drawings, are folded over the tube 20 and temporarily secured in position. When the flaps of the fabric 16 are thus folded, and the tube 20 secured, the air pressure on the said tube is removed, the tube collapsing.

When now the filler, constructed as above described, is introduced within the tire casing 9, space is provided, by reason of the collapsed condition of the tube 20, for the contraction of the clencher beads of the tire casing, which contraction permits the extension under the channel of the wheel rim 22 of the beads 10, 10.

In adjusting the tire to the vehicle wheel the usual provision is made for the valve 21. Preliminary to rotating the wheel the tube 20 is now inflated, pressure being regulated to suit. The outward expansion of the tube 20 under the condition prescribed forces the same to the position shown substantially in Fig. 4, extending laterally and outwardly the clencher edges of the tire casing 9, and seating rigidly in holding relation the beads 10, 10 under the overturned edges of the rim 22.

In Fig. 2 of the drawings a modified form of the invention is shown. The modification consists in that the filler is constructed of a number of short block segments. Each of the blocks, as shown by the cross section in said figure, is of a dimension adapted to have formed therein the pockets 12. The construction in other respects is similar to that above described, the grooves 15 being formed in the center of each of the blocks and the half-grooves 23, 23 being arranged to form, when the said blocks are joined, similar grooves.

Whether the filler being constructed is of the preferred or modified form, the operation is to all intents and purposes similar, with the exception that in the event of accident, due to wear, overheating, or otherwise, the block segments shown as the modified form could be quickly and readily removed and other segments of similar construction replaced. With a tire casing thus constructed it would not be necessary to carry, when touring, a filler of the usual dimensions, the need in this case being cared for by a supply of the block segments.

The operation of the grooves 15, 15 is to convey the air, when forced therethrough by the contraction of the pockets 12, 12, intermittently throughout each part of the structure and between the tire casing and the fabric 16 with which the filler is covered. The force applied by the compression of the tire under the carrying load is sufficient to effectually perform this function. The result of the action would be that the air would operate to part all adherence of the rubber tire casing with the fabric 16 or the filler, inducing an even temperature throughout.

Having thus described my invention, what I claim as new and desire to secure by Letters Patent is:—

1. In a vehicle tire having a tire casing, a filler for said casing comprising a cylindrical body constructed from solid compressible material and having adjacent the tread of said casing air distributing areas, said filler having formed therein a plurality of pockets, said pockets having delivery passages in open communication with said distributing areas; and a plurality of short spiral springs, one of said springs being mounted in each of said pockets and disposed to move therein parallel with the radii of the tire.

2. In a vehicle tire having a tire casing, a filler for said casing comprising a cylindrical body constructed from compressible solid material having circulating grooves formed externally thereon to provide in conjunction with said casing air ducts, said filler being further provided with a plurality of pockets separated circumferentially, each of said pockets being in open communication with said grooves to produce a circulation of air between said filler and said casing; and a plurality of short spiral springs, one of said springs being mounted in each of said pockets disposed therein to move parallel with the radii of said tire.

3. In a vehicle tire having a tire casing, a filler comprising a cylindrical body constructed from resilient solid material having formed externally thereon a series of annular grooves separated circumferentially and adapted to form in conjunction with the said casing tubes extending approximately around said filler, said filler having formed therein solid walled pockets, each of said pockets having a passage to deliver air from said pockets against the said casing and within the one of said grooves.

In testimony whereof I have signed my name to this specification in the presence of two subscribing witnesses.

FREDERICK A. SCHULTZ.

Witnesses:
  E. F. MURDOCK,
  PHILIP D. ROLLHAUS.